United States Patent Office 3,403,970
Patented Oct. 1, 1968

3,403,970
PROCESS FOR PREPARING CHROMATES
James B. Culbertson, Charleston, W. Va., and Headlee Lamprey, Hamden, Conn., assignors to Union Carbide Corporation, a corporation of New York
No Drawing. Filed June 2, 1964, Ser. No. 372,121
5 Claims. (Cl. 23—56)

ABSTRACT OF THE DISCLOSURE

A process for the manufacture of chromate compounds comprises providing a mixture of chromium bearing material (e.g., $Cr_2O_3$, ferrochromium, chrome ore) with barium oxide; heating the mixture in the presence of an oxygen-bearing gas at a temperature in the range of 400° C. to 1000° C. to cause inter-reaction between the mixture constituents and oxygen and the formation of metal chromate; and subsequently recovering the chromate reaction product.

---

The present invention relates to the manufacture of chromate compounds. More particularly the present invention relates to the improved manufacture of chromate compounds by a novel roasting process.

Chromate compounds, e.g., $Na_2CrO_4$, have been made in previously known processes by the roasting in air of soda ash and a chromium bearing material such as $Cr_2O_3$. The chromate compounds thus obtained are used extensively in producing sodium dichromate and in making metal-chromate pigments.

However, it has been found, using techniques of this type, that the recoverey of chromium in the form of chromate has been undesirably low, even when temperatures close to the melting point of soda ash (850° C.) have been employed. At lower temperatures e.g., 400–500° C., there is practically no chromate formation.

The use of lime has been proposed in place of soda ash, in view of its higher melting point, however, the results obtained have not been significantly better than with the use of soda ash. Neither has the use of lime and soda ash in combination provided any substantial improvement at low temperatures.

It is therefore an object of the present invention to provide a simple and economic chromate roasting process which provides increased recoveries of chromate compounds.

It is a further object of the present invention to provide a chromate roasting process which provides high chromate recoveries over a wide range of operating temperatures.

Other objects will be apparent from the following description and claims.

A process in accordance with the present invention for the manufacture of chromate compounds comprises providing a mixture of chromium bearing material with barium oxide; heating the mixture in the presence of an oxygen-bearing gas at a temperature in the range of 400° C. to 1000° C. to cause inter-reaction between the mixture constituents and oxygen and the formation of metal chromate; and subsequently recovering the chromate reaction product, i.e., hexavalent chromium.

In the practice of the present invention, a chromium bearing material such as $Cr_2O_3$ is admixed in the finely divided state with barium oxide. The amount of barium oxide ranges from 4 to 8 times, by weight, the amount of chromium as Cr, preferably from 4.4 to 5.0. The admixture can be suitably blended using a ball mill or other similar apparatus and when mixing has been completed the material is introduced into a suitable roasting apparatus. Such apparatus includes a shaft furnace, horizontal furnace, trays, or other equipment in which gas can be passed through to contact the the solids being heated therein.

After being charged to the roasting apparatus, the materials are heated to between 400° C. and 1000° C. while concurrently, the materials are contacted with oxygen bearing gas. For example, air, mixtures of oxygen with inert gases and pure oxygen can be used. The gas-solids contact can be provided, following conventional techniques, by passing a flow of gas through the charge, as in a shaft furnace, or over the charge as in a horizontal furnace. A rotary kiln can be used as the roasting apparatus in which case the oxygen-bearing gas can be passed over the heated charge.

In any event, regardless of the type apparatus employed, the gas contact with the solids at temperature should be sufficient to supply at least ¾ mole of available oxygen per mole of chromium. It has been found that a mixture of argon or other inert gas with oxygen in the practice of the present invention is permissible but not always desirable since the inert gas will absorb heat and thus affect overall process efficiency.

Ordinarily heating the charge materials in an atmosphere of oxygen-bearing gas with or without admixed argon, for about 30 minutes at 450° C. will be sufficient to provide a substantially complete reaction and formation of chromate. Depending upon the amount of material being processed, and the type of apparatus used, somewhat longer or shorter operating time will be used.

In general, the operating time for virtually complete conversion varies only slightly for temperatures between 450° and 850° C., and tends to increase below and above this temperature range.

The following equation is considered to theoretically represent the reaction which takes place in the practice of the present invention when using BaO, $Cr_2O_3$ and oxygen as the reaction materials:

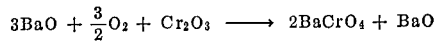

$$3BaO + \frac{3}{2}O_2 + Cr_2O_3 \longrightarrow 2BaCrO_4 + BaO$$

When the chromate-forming reaction is substantially completed, the solid reaction product is removed from the furnace and digested with sulfuric acid of any convenient concentration, e.g. 84% to react with the produced $BaCrO_4$ and provide $BaSO_4$ plus $CrO_3$ in solution. The resulting slurry is filtered and $CrO_3$ is subsequently recovered in pure form by evaporation of the filtrate.

In a particular embodiment of the present invention, a roasting temperature of 450° C. to 650° C. is employed and it has been found that exceptionally high chromate recoveries are obtained in relatively short periods of time.

The following examples are provided to further illustrate the present invention.

EXAMPLE I $Cr_2O_3$, sized 325 mesh x D, in the amount of 1 lb. was mixed with 5 lbs. of BaO powder.

The mixture was rolled together on polyethylene sheet and placed in a silica boat in a laboratory tube furnace which was sealed except for an inlet and outlet passage for the introduction and exit of gas.

The mixture was heated in the furnace to 850° C. and held at this temperature for 30 minutes; while at this temperature a 1:1 $O_2$-argon mixture was passed over the materials in the furnace at a rate of about 30 liters per minute.

At the end of the heating period, the solid reaction materials were reacted with a 20% sodium sulfate solution. The resulting slurry was filtered and the filtrate was evaporated and sodium chromate was recovered.

Analysis showed that 66% of the chromium in the starting material was recovered as chromate.

EXAMPLE II

The same procedure as in Example I was used except that CaO was used instead of BaO. The amount of chromium recovered as chromate was 9.1%.

EXAMPLE III

Ferrochromium (minus 325 mesh), in the amount of 1 lb. was mixed with 5 lbs. of BaO powder.

The mixture was rolled together on polyethylene sheet and placed in a ceramic boat in a laboratory tube furnace which was sealed except for an inlet and outlet passage for the introduction and exit of gas.

The mixture was heated in the furnace to 1000° C. and held at this temperature for 1 hour; while at this temperature a 1:1 $O_2$-argon mixture was passed over the materials in the furnace at a rate of about 30 liters per minute.

At the end of the heating period, the solid reaction materials were reacted with a 20% sodium sulfate solution. The resulting slurry was filtered and the filtrate was evaporated and sodium chromate was recovered.

Analysis showed that 36% of the chromium in the starting material was recovered as chromate.

EXAMPLE IV

The same procedure as in Example III was used except that CaO was used instead of BaO. The amount of chromium recovered as chromate was 5.4%.

EXAMPLE V

Chrome ore (46% $Cr_2O_3$, 26% FeO, 10% MgO, 15% $Al_2O_3$, 2% $SiO_2$+CaO) sized 325 mesh x D, in the amount of 1 lb. was mixed with 5 lbs. of BaO powder.

The mixture was rolled together on polyethylene sheet placed in a silica boat in a laboratory tube furnace which was sealed except for an inlet and outlet passage for the instroduction of gas.

The mixture was heated in the furnace to 1000° C. and held at this temperature for 60 minutes; while at this temperature a 1:1 argon-oxygen mixture was passed over the materials, in the furnace at a rate of about 30 liters per minute.

At the end of the heating period, the solid reaction materials were reacted with 20% sodium sulfate solution. The resulting slurry was filtered and the filtrate was evaporated and sodium chromate was recovered.

Analysis showed that about 36.5% of the chromium in the starting material was recovered as chromate.

EXAMPLE VI

The same procedure as in Example V were used except that SrO was used instead of BaO. The amount of chromium recovered as chromate was about 5%.

EXAMPLE VII

The same materials and procedure were used as in Example I except that the operating temperature was 1000° C. The amount of chromium recovered as chromate was 73%.

EXAMPLE VIII

The same materials and procedure were used as in Example I except that the operating temperature was 650° C. The amount of chromium recovered as chromate was 95%.

EXAMPLE IX

The same materials and procedure were used as in Example I except that the operating temperature was 450° C. The amount of chromium recovered as chromate was 88%.

The data obtained in the foregoing examples is shown in Table I.

TABLE I

| Charge | Charge ratio | Atmosphere | Temperature, °C. | Time, minutes | Cr converted to Chromate, Percent |
|---|---|---|---|---|---|
| $Cr_2O_3$+BaO | 1:5 | 1:1 $O_2$+argon | 850 | 30 | 66 |
| $Cr_2O_3$+CaO | 1:5 | do | 850 | 30 | 9.1 |
| Ferrochromium+BaO | 1:3 | do | 1,000 | 60 | 36 |
| Ferrochromium+CaO | 1:3 | do | 1,000 | 60 | 5 |
| Chrome ore (chromite)+BaO | 1:5 | do | 1,000 | 60 | 36.5 |
| Chrome ore (chromite)+SrO | 1:5 | do | 1,000 | 60 | 15 |
| $Cr_2O_3$+BaO | 1:5 | do | 1,000 | 30 | 73 |
| $Cr_2O_3$+BaO | 1:5 | do | 650 | 30 | 95 |
| $Cr_2O_3$+BaO | 1:5 | do | 450 | 30 | 88 |

As can be clearly seen from Table I a very substantial improvement is obtained using BaO in accordance with the present invention as compared to the use of CaO or SrO.

It is particularly significant that using BaO in the present invention, at operating temperatures of 450° C. to 650° C., provides a remarkable improvement in chromium recovery as chromate.

In addition to chrome ore, chrome oxide and ferrochromium, other chromium bearing materials can be used in the practice of the present invention, for example chromium metal and chrome-silicon.

The mesh size referred to in the foregoing description are Tyler Series.

Other suitable acids and salts can be used in place of sulfuric acid and sodium sulfate to recover hexavalent chromium from the reaction mixture.

What is claimed is:

1. A process for oxidizing chromium-bearing materials which comprises: (1) providing a mixture of chromium-bearing material selected from the group consisting of chrome ore, chrome oxide, ferro-chromium, chromium metal and chrome-silicon with barium oxide, the barium oxide being employed in an amount at least 4.4 times, by weight, the amount of chromium as Cr in said chromium-bearing material, (2) heating the mixture in the presence of an oxygen-bearing gas containing at least 50 percent free oxygen, said heating being in the temperature range of 400° C. to 1000° C. for a time sufficient to cause reaction of the mixture constitutents and oxygen and to cause oxidation of chromium in the mixture to to chromate and (3) susequently recovering chromate values from the mixture constituents.

2. A process in accordance with claim 1 wherein the heating is conducted in the range of 450° C. to 650° C.

3. A process for oxidizing chromium bearing material which comprises (1) providing a mixture of $Cr_2O_3$ with barium oxide, the barium oxide being employed in an amount at least 4.4 times, by weight, the amount of chromium as Cr in said $Cr_2O_3$, (2) heating the mixture in the presence of an oxygen bearing gas containing at least 50 percent free oxygen, said heating being in the temperature range of 400° C. to 1000° C. for a time sufficient to cause reaction of the mixture constituents and oxygen and to cause oxidation of chrouim in the mixture to to chromate, and (3) subsequently recovering chromate values from the mixture constituents.

4. A process for oxidizing chromium-bearing material which comprises: (1) providing a mixture of ferrochromium with barium oxide, the barium oxide being employed in an amount at least 4.4 times, by weight, the amount of chromium as Cr in said ferrochromium, (2) heating the mixture in the presence of an oxygen bearing gas containing at least 50 percent free oxygen, said heating being in the temperature range of 400° C. to 1000° C. for a time sufficient to cause reaction of the mixture constituents and oxygen gas and to cause oxidation of chromium in the mixture to chromate, and (3) subsequently recovering chromate values from the mixture constituents.

5. A process for oxidizing chromium-bearing material which comprises: (1) providing a mixture of chrome ore with barium oxide, the barium oxide being employed in an amount as least 4.4 times, by weight, the amount of chromium as Cr in said chrome ore, (2) heating the mixture in the presence of an oxygen bearing gas, containing at least 50 percent free oxygen, said heating being in the temperature range of 400° C. to 1000° C. for a time sufficient to cause reaction of the mixture constituents and oxygen gas and to cause oxidation of chromium in the mixture of chromate, and (3) subsequently recovering chromate values from the mixture constituents.

References Cited

UNITED STATES PATENTS

| | | | |
|---|---|---|---|
| 1,526,325 | 2/1965 | Drefahl | 23—56 |
| 1,700,657 | 1/1929 | Treusch | 23—56 |
| 1,935,082 | 11/1933 | Demant | 23—56 |
| 1,955,326 | 4/1934 | Demant | 23—56 |
| 2,400,272 | 5/1946 | Todd | 23—56 |
| 3,095,266 | 6/1963 | Lauder et al. | 23—56 |

FOREIGN PATENTS 496,890  12/1938  Great Britain.

OSCAR R. VERTIZ, *Primary Examiner.*

B. H. LEVENSON, *Assistant Examiner.*